United States Patent Office 3,214,496
Patented Oct. 26, 1965

3,214,496
MASS POLYMERIZATION PROCESS USING A CATALYST SYSTEM COMPRISING HYDROGEN PEROXIDE, PEROXY COMPOUND AND MONOCARBOXYLIC ACID
Alva F. Harris, Wilbraham, Mass., assignor to Monsanto Company, a corporation of Delaware
No Drawing. Filed Feb. 5, 1963, Ser. No. 256,271
9 Claims. (Cl. 260—880)

This invention relates to the polymerization of styrene-type monomers and more particularly relates to the use of a novel catalyst system in the polymerization of such monomers.

It is known that styrene-type monomers can be polymerized thermally or catalytically to prepare polymers having molecular weights and residual monomer contents which vary with certain reaction parameters, e.g., the catalyst concentration, the time and temperature of the reaction, etc. It is also known that the product normally has an undesirably high residual monomer content when the parameters of a mass polymerization process are controlled so as to prepare a molding-grade polystyrene, i.e., a polystyrene having a Staudinger average molecular weight in the range of about 40,000–100,000.

As shown in U.S. Patent 2,675,362, certain catalysts make it possible to use a mass polymerization process in preparing molding-grade polystyrene having a residual monomer content as low as 0.35–0.5%, and the product has improved physical and molding properties because of the reduction in residual monomer content. It would obviously be desirable to find a catalyst capable of reducing the residual monomer content to even lower levels without otherwise causing degradation of the product because of (1) the greater improvement in the physical and molding properties of the polymer which could result from the greater reduction in residual monomer content and (2) the decreased likelihood of reaching undesirably high levels with the anomalously higher-than-normal residual monomer contents which are occasionally encountered when styrene-type monomers are mass polymerized on a commercial scale.

An object of the invention is to provide a novel process for polymerizing styrene-type monomers.

Another object is to provide a mass process for polymerizing styrene-type monomers to moldable polymers containing a minimum amount of residual monomer.

These and other objects are attained by polymerizing a polymerizable material comprising a monovinyl aromatic hydrocarbon and/or an ar-halo monovinyl aromatic hydrocarbon in the presence of a monomer-soluble mixture of (1) hydrogen peroxide, (2) a peroxy compound having a half-life of at least 10 hours in benzene at 100° C. and corresponding to the formula ROOR', wherein both R and R' represent organic radicals, and (3) a monocarboxylic acid having a dissociation constant not higher than $1.0 \times 10^{-4}$ at 25° C., the polymerization being conducted by a mass process utilizing a fairly specific time-temperature cycle as hereinafter defined.

The following examples are given to illustrate the invention. Unless otherwise specified, quantities mentioned are quantities by weight.

EXAMPLE I

Part A.—Control

Dissolve 0.04 part of di-t-butyl peroxide in 100 parts of commercial styrene containing 0.001–0.0015% t-butyl catechol. Purge the reaction vessel with nitrogen and heat at 90° C. for 24 hours to convert about 30% of the styrene to polymer. Then gradually raise the reaction temperature to 190° C. over a period of 4.75 hours and maintain the temperature at 190° C. for an additional 4 hours. The product has a Staudinger average molecular weight in the range of 40,000–70,000 and a residual monomer content of 1.45%.

Part B.—Control

Prepare two products by repeating Part A except for also dissolving, respectively, 0.005 part and 0.01 part of hydrogen peroxide in the monomer. The products have Staudinger average molecular weights in the range of 40,000–70,000 and respective residual monomer contents of 1.59% and 1.30%.

Part C.—Control

Repeat Part A except for also dissolving 0.28 part of stearic acid in the monomer. The product has a Staudinger average molecular weight in the range of 40,000–70,000 and a residual monomer content of 1.31%.

Part D

Prepare two products by repeating Part A except for also dissolving 0.28 part of stearic acid and, respectively, 0.005 part and 0.01 part of hydrogen peroxide in the monomer. The products have Staudinger average molecular weights in the range of 40,000–70,000 and respective residual monomer contents of 0.27% and 0.29%.

As demonstrated in the preceding example, the addition of hydrogen peroxide to a di-t-butyl peroxide/stearic acid catalyst system can effect a considerable decrease in the residual monomer content of the product, although the same amounts of hydrogen peroxide have substantially no effect on residual monomer content when employed in conjunction with di-t-butyl peroxide in the absence of stearic acid. Similar results are observed when Example I is repeated except that:

(1) The time-temperature cycle employed for the reaction is (a) 24 hours at 90° C., followed by 3.5 hours at 90–185° C., followed by 1 hour at 185° C., (b) 24 hours at 90° C., followed by 6.25 hours at 90–185° C., followed by 1.5 hours at 185° C., or (c) 12 hours at 110–90° C., followed by 4.5 hours at 90–190° C., followed by 3 hours at 190° C., (2) The 0.28 part of stearic acid is replaced with 0.4 part of stearic acid, 0.1 part of benzoic acid, or 0.06 part of acetic acid, or (3) The 100 parts of styrene are replaced with 100 parts of p-chlorostyrene, 100 parts of a mixture of o-, m-, and p-methylstyrenes, a mixture of 85 parts of styrene and 15 parts of acrylonitrile, a mixture of 80 parts of styrene and 20 parts of methyl methacrylate, a mixture of 75 parts of styrene and 25 parts of alpha-methylstyrene, or a solution of 10 parts of a rubbery butadiene-styrene (75:25) copolymer in 100 parts of styrene.

The present invention is a process for preparing moldable polymers containing a minimum amount of residual monomer by polymerizing a polymerizable material comprising a monovinyl aromatic hydrocarbon and/or an ar-halo monovinyl aromatic hydrocarbon in the presence of a monomer-soluble mixture of (1) hydrogen peroxide, (2) a peroxy compound having a half-life of at least 10 hours in benzene at 100° C. and corresponding to the formula ROOR', wherein both R and R' represent organic radicals, and (2) a monocarboxylic acid having a dissociation constant not higher than $1.0 \times 10^{-4}$ at 25° C. by a mass process utilizing a fairly specific time-temperature cycle.

The weak organic acid employed as a catalyst component can be any monocarboxylic acid having a dissociation constant not higher than $1.0 \times 10^{-4}$ at 25° C. Among the particularly suitable acids are acetic, hexanoic, benzoic, phenylacetic, isopropylbenzoic, and hexahydrobenzoic acids and, as a preferred embodiment of the invention, alkanoic acids containing 12–20 carbon atoms (i.e., lauric, tridecanoic, myristic, pentadecanoic, palmitic, margaric, stearic, nonadecanoic, and eicosanic acids). Stearic acid is especially preferred because of the brilliance it imparts to the molded polymers.

The reaction mixture should contain at least 0.05% of the weak organic acid, based on the weight of polymerizable material, and usually contains not more than 1% of the acid. Within the range of 0.05-1% and at higher concentrations, variations in the concentration of a particular acid seems to have no substantial effect on the molecular weights and residual monomer contents of the polymers formed by the reaction, but it is usually preferred to avoid concentrations higher than 1% in order to avoid undue yellowing of the polymer. Ordinarily the reaction mixture will contain 0.1–0.6% of the acid.

In the practice of the invention, hydrogen peroxide is employed in concentrations of about 0.005–0.01%, based on the weight of polymerizable material. The peroxy compound used in conjunction with hydrogen peroxide and the monocarboxylic acid can be any monomer-soluble peroxy compound having a half-life of at least 10 hours in benzene at 100° C. and corresponding to the formula ROOR', wherein both R and R' represent organic radicals. Utilizable peroxy compounds include, e.g., di-t-butyl diperphthalate, t-butyl peracetate, t-butyl perbenzoate, dicumyl peroxide, di-t-butyl peroxide, 2,5-dimethyl-2,5-di(t-butylperoxy)hexane, 2,5 - dimethyl - 2,5-di(t-butylperoxy) hexyne-3, etc., and mixtures thereof. The peroxy compound is employed in concentrations of 0.01–0.1%, preferably 0.01–0.05%, based on the weight of polymerizable material.

The catalyst mixtures of the invention are used in the polymerization of polymerizable materials comprising a monovinyl aromatic hydrocarbon and/or an ar-halo monovinyl aromatic hydrocarbon, e.g., styrene; vinyl naphthalene; ar-alkylstyrenes, such as o-, m-, and p-methyl-styrenes, ar-ethylstyrenes, etc.; o-chlorostyrene, p-bromostyrene; 2-chloro-4-methylstyrene, etc., and mixtures thereof. Such monovinyl aromatic monomers, as is well known, normally contain minor amounts of impurities formed as by-products of the monomer synthesis or accumulated during storage. Since the presence of these impurities appears to be more desirable than undesirable in the practice of the invention, they are not removed from the monomers prior to polymerization except when the particular application for which the product of the polymerization is intended requires the removal of one or more impurities known to contribute properties which would be undesirable in that application, e.g., excessive amounts of dissolved oxygen are removed when the application will not tolerate the degree of yellowness that would be contributed to the polymer by large amounts of oxygen.

The monovinyl aromatic monomer may constitute the only component of the polymerizable material or may be in admixture with lesser amounts of one or more copolymerizable monomers, such as acrylonitrile; methacrylonitrile; an alkyl methacrylate, e.g., the methyl, ethyl, propyl, and butyl methacrylates; the corresponding alkyl acrylates; alpha-alkylstyrenes, e.g., alpha-methylstyrene, alpha-ethylstyrene, alpha-methyl-p-methylstyrene, etc.

When desired, the polymerizable material can have a rubbery conjugated 1,3-diene polymer (e.g., natural rubber, polybutadiene, polyisoprene, copolymers of butadiene and/or isoprene with lesser amounts of comonomers such as styrene, acrylonitrile, methyl methacrylate, etc.) dissolved therein, ordinarily in amounts of 1–25%, based on the weight of polymerizable material. Also, the reaction mixture can contain other optional ingredients such as plasticizers, mineral oils, stabilizers, etc.

In order for a moldable polymer having a minimum residual monomer content to be prepared in the presence of the hydrogen peroxide/organic peroxy compound/-monocarboxylic acid mixture, the process must utilize a fairly specific time-temperature cycle. In the first stage of the reaction, polymerization is conducted at 75–125° C. for about 6–24 hours until 15–45% of the monomer has been converted to polymer; in the second stage, the reaction temperature is gradually raised from 75–95° C. to 180–200° C. over a period of about 3–7 hours; in the final stage, the reaction temperature is maintained at 180–200° C. for about 0.5–5 hours.

The manner of manipulating the reaction temperature during the first stage of the reaction in order to be in the 75–95° C. range for the beginning of the second stage of the reaction is not critical, e.g., an initial temperature of about 100–125° C. can be gradually lowered to 75–95° C. during the first stage of the reaction or the temperature can be maintained at 75–95° C. throughout the first stage of the reaction, etc. According to a particularly preferred embodiment of the invention, the reaction mixture is initially heated to 105–115° C. and maintained at a temperature gradually lowered to about 90° C. until about 90° C. until about 25–45% conversion to polymer is obtained, after which the temperature is gradually raised to 180–200° C. over a period of about 3–7 hours and then maintained at 180–200° C. for about 2–5 hours to complete the reaction. Especially good results are also obtained by initially heating the reaction mixture at 90° C. to about 25–35% conversion, then heating at a temperature gradually raised to 180–200° C. over a period of about 4–5 hours, and finally heating at 180–200° C. for 2–4 hours.

In most cases, the methods of varying one or more of the parameters of the reaction within the above-indicated limitations to achieve a desired result will be obvious to those skilled in the art. It should also be noted that (1) the minimum amount of free radical polymerization initiator required for the reaction decreases with increased concentrations of monocarboxylic acid, (2) the residual monomer content of the product decreases with an increase in the degree of polymerization accomplished at 75–125° C., and (3) the minimum required ratio of hydrogen peroxide to organic peroxy compound in the reaction mixture decreases with a decrease in the degree of polymerization accomplished at the lower polymerization temperatures of the cycle.

The process of the invention is particularly advantageous in that it permits the formation of moldable polystyrene having a lower residual monomer content than the moldable mass-polymerized styrene products of the prior art. The reduced residual monomer content improves the physical and molding properties of the polymers.

It is obvious that variations can be made in the products and processes set forth above without departing from the spirit and scope of this invention.

What is claimed is:

1. A mass polymerization process which comprises (1) dissolving a catalyst mixture consisting of:
    (a) about 0.005–0.01 part by weight of hydrogen peroxide,
    (b) about 0.01–0.1 part by weight of a peroxy compound having a half-life of at least 10 hours in benzene at 100° C. and corresponding to the formula ROOR', wherein both R and R' represent organic radicals, and
    (c) 0.05–1 part by weight of a monocarboxylic acid having a dissociation constant not higher than $1.0 \times 10^{-4}$ at 25° C.

in 100 parts by weight of a polymerizable material comprising at least a major proportion of a monovinyl aromatic monomer of the group consisting of a monovinyl aromatic hydrocarbon, an ar-halo monovinyl aromatic hydrocarbon, and mixtures thereof, (2) heating the polymerizable material at 75–125° C. until 15–45% conversion to polymer is obtained, the temperature being so regulated as to be in the 75–95° C. range when this conversion is obtained, (3) gradually raising the reaction temperature to 180–200° C. over a period of about 3–7 hours, and (4) maintaining the reaction temperature at 180–200° C. for about 0.5–5 hours.

2. The process of claim 1 wherein the polymerizable material is styrene.

3. The process of claim 1 wherein the polymerizable material is a mixture of styrene and alpha-methylstyrene.

4. The process of claim 1 wherein the polymerizable material is a mixture of styrene and acrylonitrile.

5. The process of claim 1 wherein the polymerizable material is a mixture of styrene and methyl methacrylate.

6. The process of claim 1 wherein the polymerizable material contains a dissolved rubbery conjugated 1,3-diene polymer.

7. The process of claim 1 wherein the organic peroxy compound is di-t-butyl peroxide.

8. The process of claim 1 wherein the monocarboxylic acid is an alkanoic acid containing 12–20 carbon atoms.

9. A mass polymerization process which comprises (1) dissolving a catalyst mixture consisting of (a) about 0.005–0.01 part by weight of hydrogen peroxide, (b) 0.01–0.05 part by weight of di-t-butyl peroxide, and (c) 0.1–0.6 part by weight of stearic acid in 100 parts by weight of styrene, (2) heating the styrene to 105–115° C. and then gradually lowering the temperature to about 90° C. to obtain 25–45% conversion to polymer, (3) gradually raising the temperature to 180–200° C. over a period of about 3–7 hours, and (4) maintaining the reaction temperature at 180–200° C. for 2–5 hours.

References Cited by the Examiner
UNITED STATES PATENTS

| | | | |
|---|---|---|---|
| 2,675,362 | 4/54 | Shusman | 260—23 |
| 2,886,553 | 5/59 | Stein et al. | 260—93.5 |
| 2,984,648 | 5/61 | Williams et al. | 260—93.5 |

JOSEPH L. SCHOFER, *Primary Examiner.*

DONALD E. CZAJA, *Examiner.*